US010671218B2

(12) United States Patent
Liu et al.

(10) Patent No.: US 10,671,218 B2
(45) Date of Patent: Jun. 2, 2020

(54) FLOATING TOUCH CONTROL PANEL, TOUCH CONTROL METHOD OF THE SAME, AND DISPLAY DEVICE

(71) Applicant: BOE Technology Group Co., Ltd., Beijing (CN)

(72) Inventors: Yingming Liu, Beijing (CN); Xue Dong, Beijing (CN); Haisheng Wang, Beijing (CN); Xiaoliang Ding, Beijing (CN); Chun Wei Wu, Beijing (CN); Chih Jen Cheng, Beijing (CN); Yuzhen Guo, Beijing (CN); Yanling Han, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 15/757,562

(22) PCT Filed: Sep. 21, 2017

(86) PCT No.: PCT/CN2017/102790
§ 371 (c)(1),
(2) Date: Mar. 5, 2018

(87) PCT Pub. No.: WO2018/161530
PCT Pub. Date: Sep. 13, 2018

(65) Prior Publication Data
US 2020/0050322 A1    Feb. 13, 2020

(30) Foreign Application Priority Data
Mar. 9, 2017    (CN) .......................... 2017 1 0137969

(51) Int. Cl.
G06F 3/042    (2006.01)
G06F 3/041    (2006.01)
G06F 3/043    (2006.01)

(52) U.S. Cl.
CPC .......... *G06F 3/0421* (2013.01); *G06F 3/0412* (2013.01); *G06F 3/0436* (2013.01);
(Continued)

(58) Field of Classification Search
None
See application file for complete search history.

(56) References Cited

U.S. PATENT DOCUMENTS

2014/0354597 A1*    12/2014    Kitchens, II .......... G06F 1/3215
                                                             345/175
2014/0368461 A1    12/2014    Han et al.
(Continued)

FOREIGN PATENT DOCUMENTS

CN    104238660 A    12/2014
CN    104679355 A    6/2015
(Continued)

OTHER PUBLICATIONS

PCT/CN2017/102790 International Search Report.
Chinese First Office Action for corresponding Chinese Application dated Feb. 23, 2018.

*Primary Examiner* — Christopher J Kohlman
(74) *Attorney, Agent, or Firm* — Arent Fox LLP; Michael Fainberg

(57) ABSTRACT

Disclosed floating touch control panel includes a substrate, a modulated light source, a read sub-circuit, an output sub-circuit, an ultrasonic wave sensing unit and a light sensing unit; the ultrasonic wave sensing unit is configured to transmit an ultrasonic wave to a touch control side, to convert an ultrasonic wave reflected back from the touch control side into an electric signal and then provide it to a first node; the light sensing unit is configured to convert a modulated light reflected from the touch control side into an electric signal and then provide it to the first node; the read sub-circuit is configured to output a touch control signal to
(Continued)

the output sub-circuit according to a potential of the first node; the output sub-circuit is configured to be controlled by a corresponding first touch control scan line to provide a touch control read line with the received touch control signal.

16 Claims, 6 Drawing Sheets

(52) U.S. Cl.
CPC ............... *G06F 3/04166* (2019.05); *G06F 2203/04107* (2013.01); *G06F 2203/04108* (2013.01)

(56) References Cited

U.S. PATENT DOCUMENTS

| | | |
|---|---|---|
| 2015/0042580 A1 | 2/2015 | Shim et al. |
| 2017/0097734 A1 | 4/2017 | Yang et al. |
| 2017/0102812 A1 | 4/2017 | Gu |
| 2018/0046302 A1 | 2/2018 | Wang et al. |

FOREIGN PATENT DOCUMENTS

| | | |
|---|---|---|
| CN | 104808867 A | 7/2015 |
| CN | 105308622 A | 2/2016 |
| CN | 105843446 A | 8/2016 |
| CN | 106896963 A | 6/2017 |

\* cited by examiner

FLOATING TOUCH CONTROL PANEL, TOUCH CONTROL METHOD OF THE SAME, AND DISPLAY DEVICE

This application is a National Stage of International Application No. PCT/CN2017/102790, filed Sep. 21, 2017, which claims priority to Chinese Patent Application No. 201710137969.7, filed Mar. 9, 2017, both of which are hereby incorporated by reference in their entireties.

FIELD

The present disclosure relates to the field of touch control technologies, and particularly to a floating touch control panel, a touch control method of the same, and a display device.

BACKGROUND

The floating touch control is a new touch control mode in which a touch control operation can be performed without any contact with a touch screen. That is, clicking, sliding, and other operations can be performed on the touch screen with some distance between a finger and the screen.

The existing floating touch control is generally enabled using an infrared sensor and a capacitive and highly sensitive touch control element. Where the infrared sensor emits infrared rays while the touch screen is displaying, and when there is some distance between a finger of a user, and the screen, the infrared rays reflected by the finger are received by the infrared sensor, and the position and the particular action of the finger are determined according to the received infrared rays. In this implementation of the floating touch control, when there is a short distance between the finger and the screen, the infrared rays propagate at such a high velocity that if the infrared sensor fails to respond rapidly, then the touch control action may not be recognized rapidly, so the infrared sensor is required to be highly responsive.

With the capacitive and highly sensitive touch control element, the sensitivity of the capacitive touch control is enhanced so that the sensing capacitor can recognize the touch control action without the finger touching the screen, thus achieving the floating touch control. However there is a short distance required between the finger and the screen in an implementation of this floating touch control mode, so there is a limited floating touch control capacity thereof.

SUMMARY

Embodiments of the disclosure provide a floating touch control panel including: a substrate, and a modulated light source, a plurality of touch control circuits arranged in an array, a plurality of first touch control scan lines corresponding to respective rows of the plurality of touch control circuits, and a plurality of touch control read lines corresponding to respective columns of the plurality of touch control circuits, which are located on the substrate; wherein the modulated light source is configured to transmit modulated light to a touch control side; and each of the plurality of touch control circuits includes a touch control sub-circuit, a read sub-circuit, and an output sub-circuit, wherein: the touch control sub-circuit includes an ultrasonic wave sensing unit and a light sensing unit, wherein the ultrasonic wave sensing unit is configured to transmit an ultrasonic wave to the touch control side, to convert an ultrasonic wave reflected back from the touch control side into an electric signal, and to provide a first node with the electric signal converted by the ultrasonic wave sensing unit; the light sensing unit is configured to convert a modulated light reflected from the touch control side into an electric signal, and to provide the first node with the electric signal converted by the light sensing unit; the read sub-circuit is configured to output a touch control signal to the output sub-circuit according to a potential of the first node; and the output sub-circuit is configured to be controlled by a corresponding first touch control scan line to provide a corresponding touch control read line with the received touch control signal.

In the floating touch control panel according to the embodiments of the disclosure, the ultrasonic wave sensing unit includes an ultrasonic wave transmitter, an ultrasonic wave receiver, a rectifying diode, and a shielding layer overlying the rectifying diode, which are located on the substrate, wherein an anode of the rectifying diode is connected with the ultrasonic wave receiver, and a cathode of the rectifying diode is connected with the first node.

In the floating touch control panel according to the embodiments of the disclosure, the ultrasonic wave receiver includes a first electrode, a first piezoelectric material layer, and a second electrode, which are sequentially stacked on the substrate, wherein one of the first electrode and the second electrode is connected with the anode of the rectifying diode, and the other of the first electrode and the second electrode is configured to apply first fixed voltage.

In the floating touch control panel according to the embodiments of the disclosure, all of the plurality of touch control circuits share one ultrasonic wave transmitter, wherein the ultrasonic wave transmitter includes a first planar electrode, a second piezoelectric material layer, and a second planar electrode, which overly the substrate in that order; and one of the first planar electrode and the second planar electrode is configured to apply second fixed voltage, and the other of the first planar electrode and the second planar electrode is configured to apply alternating voltage.

In the floating touch control panel according to the embodiments of the disclosure, the light sensing unit includes a photosensitive diode located on the substrate, and facing the touch control side; and an anode of the photosensitive diode is configured to apply third fixed voltage, and a cathode of the photosensitive diode is connected with the first node.

In the floating touch control panel according to the embodiments of the disclosure, the ultrasonic wave receiver is located on a side of the substrate facing the touch control side, and the anode of the photosensitive diode is connected with a second electrode of an ultrasonic wave receiver in a touch control circuit including the photosensitive diode.

In the floating touch control panel according to the embodiments of the disclosure, the light sensing unit further includes a condensing lens located on a side of the photosensitive diode facing the touch control side.

In the floating touch control panel according to the embodiments of the disclosure, there are further arranged on the substrate second touch control scan lines corresponding to the respective rows of the plurality of touch control circuits; and each of the plurality of touch control circuits further includes a reset sub-circuit configured to be controlled by a corresponding second touch control scan line to reset the potential of the first node.

In the floating touch control panel according to the embodiments of the disclosure, second touch control scan lines corresponding to the respective rows of the plurality of touch control circuits other than a first row of the plurality of touch control circuits are first touch control scan lines corresponding to preceding rows of the plurality of touch control circuits.

In the floating touch control panel according to the embodiments of the disclosure, second touch control scan lines corresponding to the respective rows of the plurality of touch control circuits other than a last row of the plurality of touch control circuits are first touch control scan lines corresponding to succeeding rows of the plurality of touch control circuits.

In the floating touch control panel according to the embodiments of the disclosure, the reset sub-circuit includes a first switch transistor, wherein a gate of the first switch transistor is connected with a corresponding second touch control scan line, a first electrode of the first switch transistor is configured to receive a reset signal, and a second electrode of the first switch transistor is connected with the first node.

In the floating touch control panel according to the embodiments of the disclosure, the read sub-circuit includes a drive transistor, wherein a gate of the drive transistor is connected with the first node, a first electrode of the drive transistor is configured to receive a reference signal, and a second electrode of the drive transistor is configured to be connected with the output sub-circuit.

In the floating touch control panel according to the embodiments of the disclosure, the output sub-circuit includes a second switch transistor, wherein a gate of the second switch transistor is connected with a corresponding first touch control scan line, a first electrode of the second switch transistor is connected with the read sub-circuit, and a second electrode of the second switch transistor is connected with a corresponding touch control read line.

In the floating touch control panel according to the embodiments of the disclosure, there are further pixel elements arranged in a matrix on the substrate; and at least a part of the pixel elements each includes at least four sub-pixel areas, wherein one of the plurality of touch control circuits is arranged in one of the at least four sub-pixel areas, and sub-pixel structures for displaying are arranged in remaining sub-pixel areas of the at least four sub-pixel areas.

In the floating touch control panel according to the embodiments of the disclosure, the substrate is defined as a display area, and a border area surrounding the display area, wherein the pixel elements arranged in the matrix are located in the display area, and the modulated light source is located in the border area.

Embodiments of the disclosure further provide a display device including any one touch control panel according to the embodiments of the disclosure.

Embodiments of the disclosure further provide a touch control method of the floating touch control panel above, wherein for scanning each frame for a touch control, the method includes the operations of: before each frame is scanned for a touch control, turning on the modulated light source, and controlling the ultrasonic wave sensing unit in each of the plurality of touch control circuits to emit the ultrasonic wave; and scanning each frame for a touch control by scanning each of the plurality of first touch control scan lines row by row, and when a touch control distance greater than a preset distance is determined, turning off the ultrasonic wave, and when the touch control distance less than or equal to the preset distance is determined, turning off the modulated light source.

DETAILED DESCRIPTION OF THE EMBODIMENTS

Figure 1:
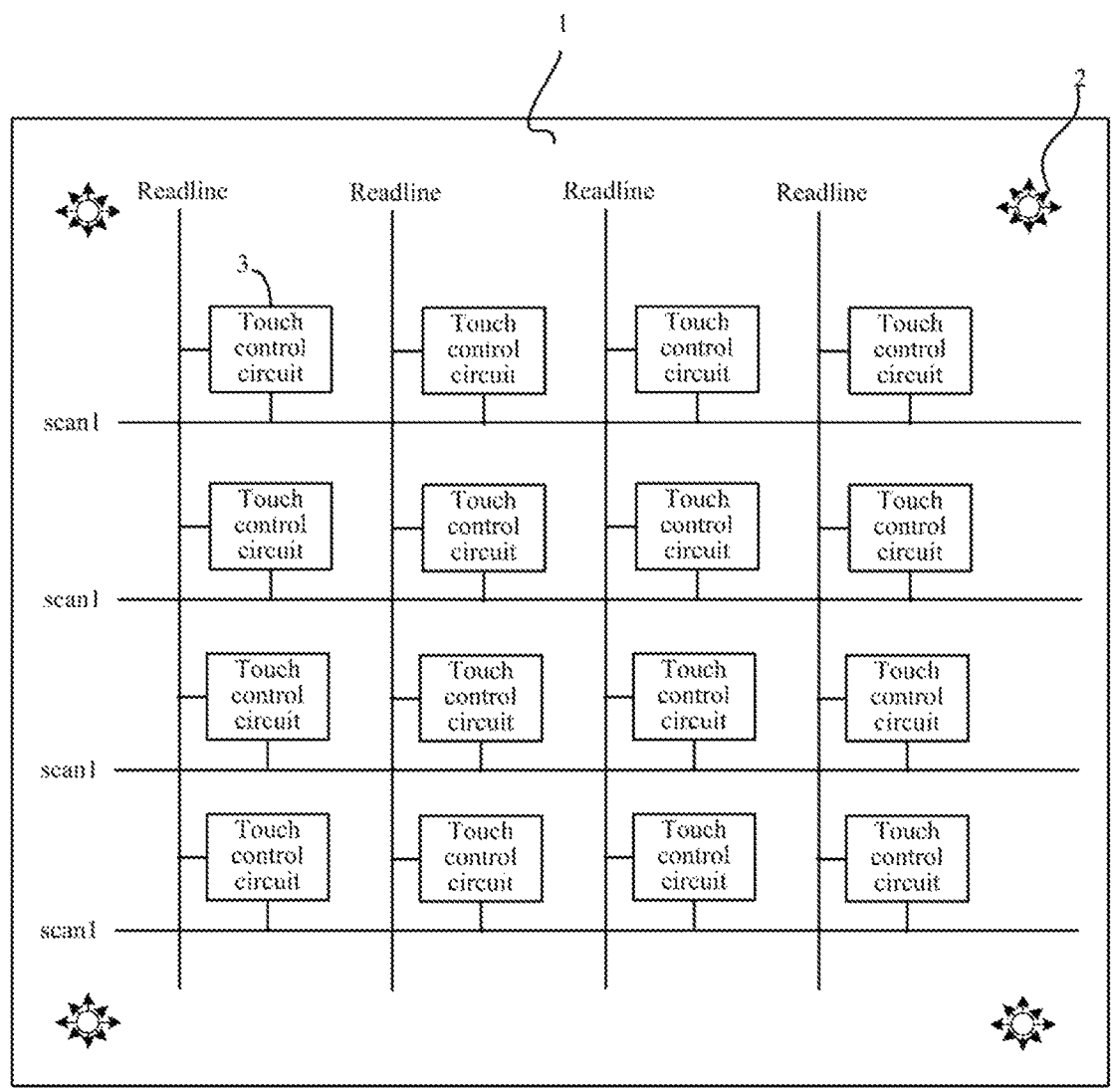
FIG. 1 is a first schematic structural diagram of a floating touch control panel according to an embodiment of the disclosure.

In order to make the objects, technical solutions, and advantages of the disclosure more apparent, the disclosure will be described below in further details with reference to the drawings. Apparently the embodiments to be described are only a part but not all of the embodiments of the disclosure. Based upon the embodiments here of the disclosure, all of other embodiments which can occur to those ordinarily skilled in the art without any inventive effort shall come into the scope of the disclosure as claimed.

The shapes and sizes of respective components in the drawings are not intended to reflect any real proportion, but merely intended to illustrate the disclosure.

As illustrated in FIG. 1, a floating touch control panel according to embodiments of the disclosure includes a substrate 1, and a modulated light source 2, a plurality of touch control circuits 3 arranged in an array, a plurality of first touch control scan lines scan1 corresponding to respective rows of the plurality of touch control circuits 3, and a plurality of touch control read lines readline corresponding to respective columns of the plurality of touch control circuits 3, which are arranged on the substrate 1, where the modulated light source 2 is configured to transmit modulated light to a touch control side.

Figure 2:
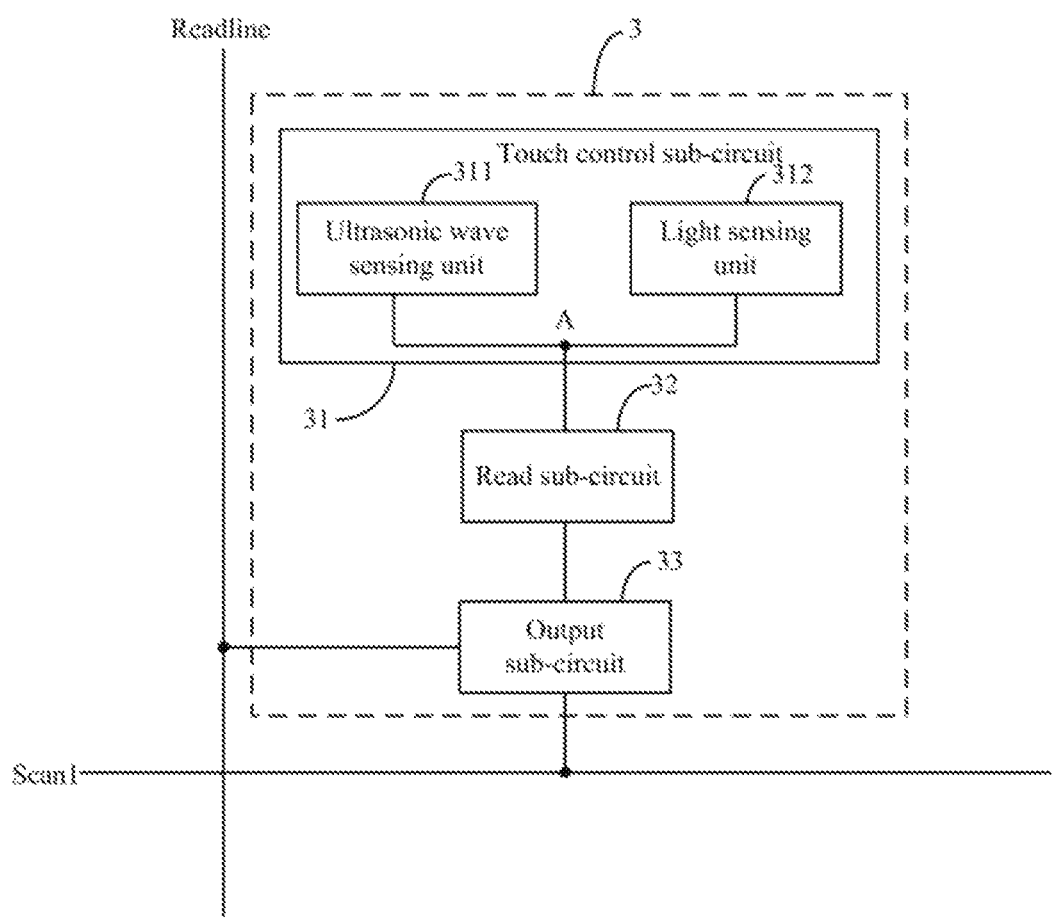
FIG. 2 is a first schematic structural diagram of a touch control circuit according to an embodiment of the disclosure.

As illustrated in FIG. 2, each touch control circuit 3 includes a touch control sub-circuit 31, a read sub-circuit 32, and an output sub-circuit 33.

The touch control sub-circuit 31 includes an ultrasonic wave sensing unit 311 and a light sensing unit 312, where the ultrasonic wave sensing unit 311 is configured to transmit an ultrasonic wave to the touch control side, to convert an ultrasonic wave reflected back from the touch control side into an electric signal, and to provide a first node A with the electric signal converted by the ultrasonic wave sensing unit; and the light sensing unit 312 is configured to convert a modulated light reflected from the touch control side into an electric signal, and to provide the first node A with the electric signal converted by the light sensing unit.

The read sub-circuit 32 is configured to output a touch control signal to the output sub-circuit 33 according to a potential of the first node A.

The output sub-circuit 33 is configured to be controlled by a corresponding first touch control scan line scan1 to provide a corresponding touch control read line readline with the received touch control signal.

Particularly in the floating touch control panel above according to the embodiments of the disclosure, when there is a floating touch control at a short distance, the sound wave is transmitted at such a lower velocity than the light velocity that the ultrasonic wave sensing unit 311 is not required to be highly responsive, so the touch control action can be recognized according to the signal fed back by the ultrasonic wave sensing unit 311. When there is a floating touch control at a long distance, the sound wave is transmitted at such a low velocity that when there is a rapidly changing gesture, the ultrasonic wave sensing unit 311 receives the signal at such a delay that the information is delayed; and the light propagates at such a high velocity that the touch control action can be recognized according to the signal fed back by the light sensing unit 312. In this way, when the floating touch control is performed at either a short or long distance, the touch control action can be recognized rapidly and accurately with the combination of the ultrasonic wave sensing unit 311 and the light sensing unit 312.

Particularly in the floating touch control panel according to the embodiments of the disclosure, each touch control circuit 3 operates under such a principle that when there is a touch control, the touch control sub-circuit 31 in the each touch control circuit 3 provides the first node A with an electric signal according to the touch control; the read sub-circuit 32 outputs a touch control signal to the output sub-circuit 33 according to the potential of the first node A; and when some first touch control scan line scan1 is scanned, the first touch control scan line scan1 controls the output sub-circuit 33 to provide a corresponding touch control read line with the received touch control signal, so that a touch control action is recognized according to a signal output on the touch control read line readline.

Optionally in the floating touch control panel according to the embodiments of the disclosure, one touch control circuit 3 may correspond to one modulated light source 2, or, of course, several touch control circuits 3 of the plurality of touch control circuits may correspond to one modulated light source 2, although the embodiments of the disclosure will not be limited thereto.

Figure 3:
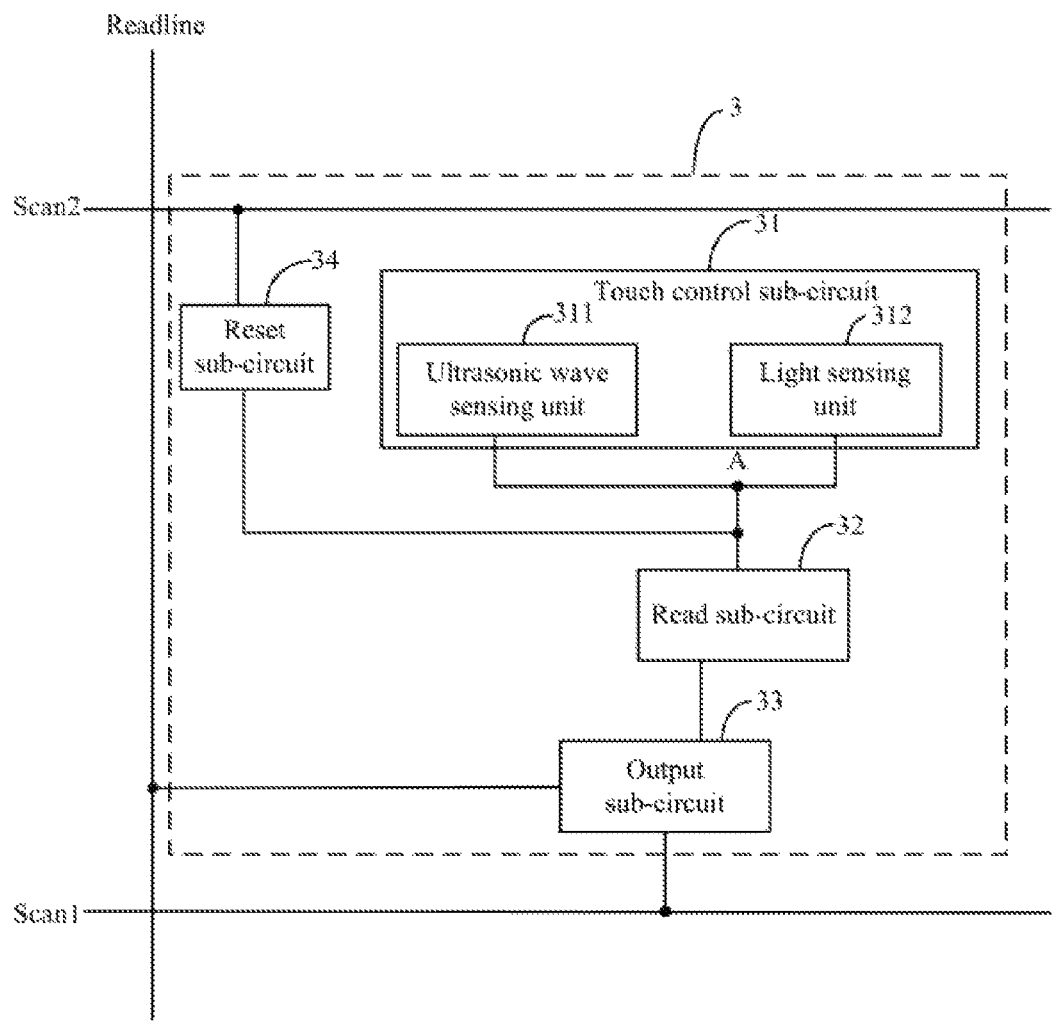
FIG. 3 is a second schematic structural diagram of a touch control circuit according to an embodiment of the disclosure.

Optionally in the floating touch control panel according to the embodiments of the disclosure, taking a touch control circuit 3 as an example, each time the first touch control scan lines scan1 are scanned, signals on the touch control read lines readline are collected, and since the signal on any touch control read line readline is determined by a signal on the first node A, in order to avoid the signal on the first node A from being affected by last scanning, as illustrated in FIG. 3, there may be further arranged on the substrate 1 second touch control scan lines scan2 corresponding to the respective rows or columns of the plurality of touch control circuits 3; and each touch control circuit 3 further includes a reset sub-circuit 34 configured to be controlled by a corresponding second touch control scan line scan2 to reset the potential of the first node A, so that the potential of the first node A can be firstly reset before the first touch control scan lines scan1 are scanned, to thereby improve the accuracy of the touch control.

It shall be noted that in the floating touch control panel according to the embodiments of the disclosure, a row and a column merely represent two directions intersecting with each other, and for example, a row of the plurality of touch control circuits 3 can be arranged in the row direction, or can be arranged in the column direction, although the embodiments of the disclosure will not be limited thereto.

Optionally the extension direction of a row of the plurality of touch control circuits 3 is generally arranged as the row direction, and the extension direction of a column of the plurality of touch control circuits 3 is arranged as the column direction. For example, when both the first touch control scan lines scan1 and the second touch control scan lines scan2 correspond to a row of the plurality of touch control circuits 3, both the extension directions of the first touch control scan lines scan1 and the second touch control scan lines scan2 are arranged as the row direction, and when both the first touch control scan lines scan1 and the second touch control scan lines scan2 correspond to a column of the plurality of touch control circuits 3, both the extension directions of the first touch control scan lines scan1 and the second touch control scan lines scan2 are arranged as the column direction. Alike the touch control read lines readline are arranged in the same way, so a repeated description thereof will be omitted here.

Optionally in the floating touch control panel according to the embodiments of the disclosure, the second touch control scan lines scan2 corresponding to the respective rows of the plurality of touch control circuits 3 other than a first row of the plurality of touch control circuits 3 can be first touch control scan lines scan1 corresponding to preceding rows of the plurality of touch control circuits 3, so that the amount of wiring can be reduced. Particularly by way of an example in which the extension directions of the first touch control scan lines scan1 and the second touch control scan lines scan2 are the row direction, both sides of each row of the plurality of touch control circuits 3 can be arranged with one first touch control scan line scan1 respectively, and one first touch control scan line scan1 can be arranged between two adjacent rows of the plurality of touch control circuits 3. For the n-th row of the plurality of touch control circuits 3, its corresponding first touch control scan line scan1 can be the (n+1)-th touch control scan line, and its corresponding second touch control scan line scan2 can be the n-th touch control scan line.

Or optionally in the floating touch control panel according to the embodiments of the disclosure, the second touch control scan lines scan2 corresponding to the respective rows of the plurality of touch control circuits 3 other than a last row of the plurality of touch control circuits 3 can be first touch control scan lines scan1 corresponding to succeeding rows of the plurality of touch control circuits 3, so that the amount of wiring can be reduced. Particularly by way of an example in which the extension directions of the first touch control scan lines scan1 and the second touch control scan lines scan2 are the row direction, both sides of each row of the plurality of touch control circuits 3 can be arranged with one first touch control scan line scan1 respectively, and one first touch control scan line scan1 can be arranged between two adjacent rows of the plurality of touch control circuits 3. For the n-th row of the plurality of touch control circuits 3, its corresponding first touch control scan line scan1 can be the n-th touch control scan line, and its corresponding second touch control scan line scan2 can be the (n+1)-th touch control scan line.

Or optionally in the floating touch control panel according to the embodiments of the disclosure, the second touch control scan lines scan2 corresponding to the respective rows of the plurality of touch control circuits 3 can alternatively be first touch control scan lines scan1 corresponding to the other rows of the plurality of touch control circuits 3, although the embodiments of the disclosure will not be limited thereto.

The disclosure will be described below in details in connection with a particular embodiment thereof. It shall be noted this embodiment is intended to better set forth the disclosure, but not to limit it thereto.

Figure 4:
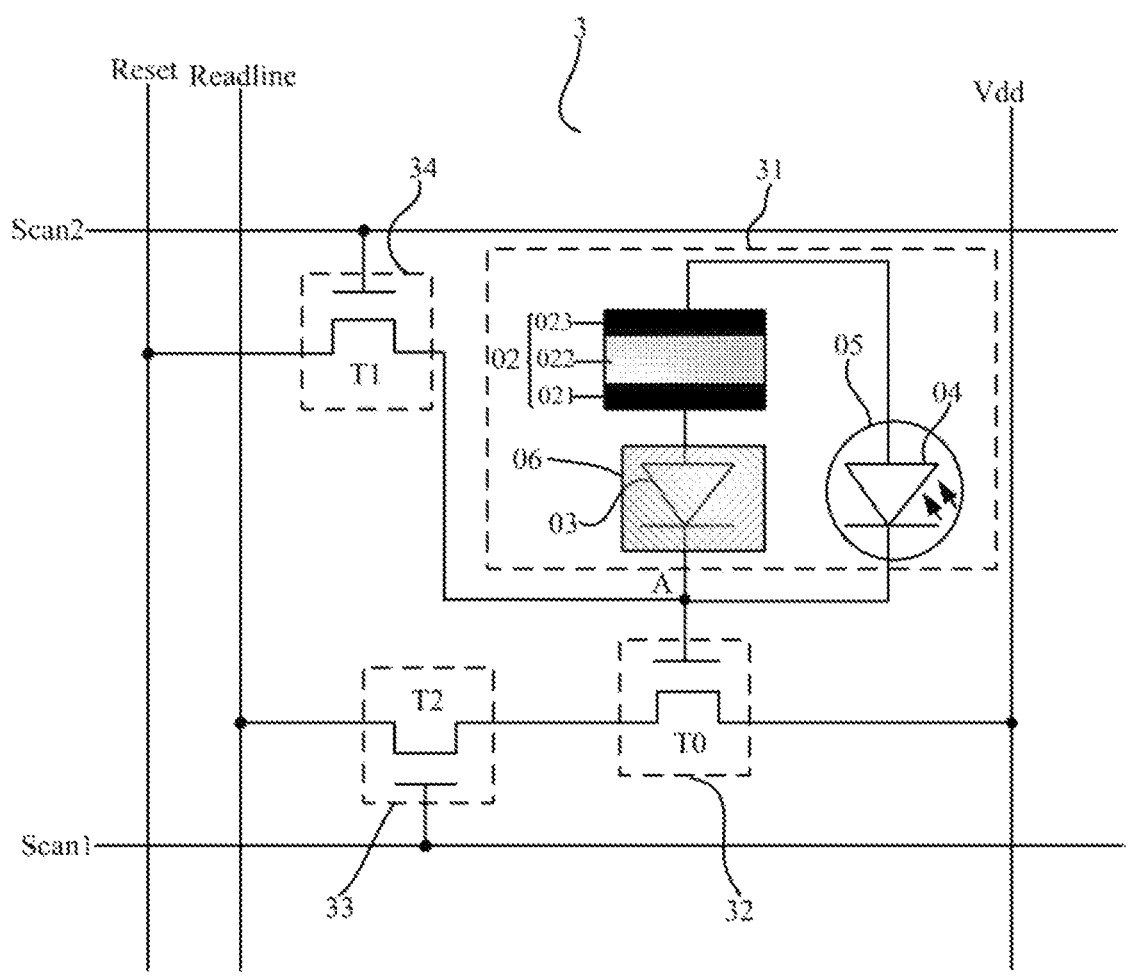
FIG. 4 is a third schematic structural diagram of a touch control circuit according to an embodiment of the disclosure.

Optionally in the floating touch control panel according to the embodiments of the disclosure, as illustrated in FIG. 4, the ultrasonic wave sensing unit 311 includes an ultrasonic wave transmitter (not illustrated in FIG. 4), an ultrasonic wave receiver 02, a rectifying diode 03, and a shielding layer 06 overlying the rectifying diode 03, which are located on the substrate 1; and an anode of the rectifying diode 03 is connected with the ultrasonic wave receiver 02, and a cathode of the rectifying diode 03 is connected with the first node A. Therefore when an ultrasonic wave transmitted by the ultrasonic wave transmitter is reflected back by a touching finger, the ultrasonic wave is received by the ultrasonic wave receiver 02, and the ultrasonic wave receiver 02 converts the received ultrasonic wave into an electric signal; and only when an ultrasonic wave which is fed back constantly is stronger than the first ultrasonic wave, an electric signal can pass the rectifying diode 03, and thus be accumulated on the first node A.

Optionally in the floating touch control panel according to the embodiments of the disclosure, as illustrated in FIG. 4, the ultrasonic wave receiver 02 includes a first electrode 021, a first piezoelectric material layer 022, and a second electrode 023, which are sequentially stacked on the substrate 1.

One of the first electrode 021 and the second electrode 023 is connected with the anode of the rectifying diode 03, and the other of the first electrode 021 and the second electrode 023 is configured to apply first fixed voltage. Particularly FIG. 4 illustrates the first electrode 021 connected with the anode of the rectifying diode 03, and the second electrode 023 configured to apply the first fixed voltage, by way of an example.

Optionally in the floating touch control panel according to the embodiments of the disclosure, the ultrasonic wave receiver 02 is generally located on a side of the substrate 1 facing the touch control side, so that the distance between the ultrasonic wave which is reflected back, and the ultrasonic wave receiver 02 can be shortened. Of course, the ultrasonic wave receiver 02 can alternatively be located on a side of the substrate 1 facing away from the touch control side, although the embodiments of the disclosure will not be limited thereto.

Figure 5:
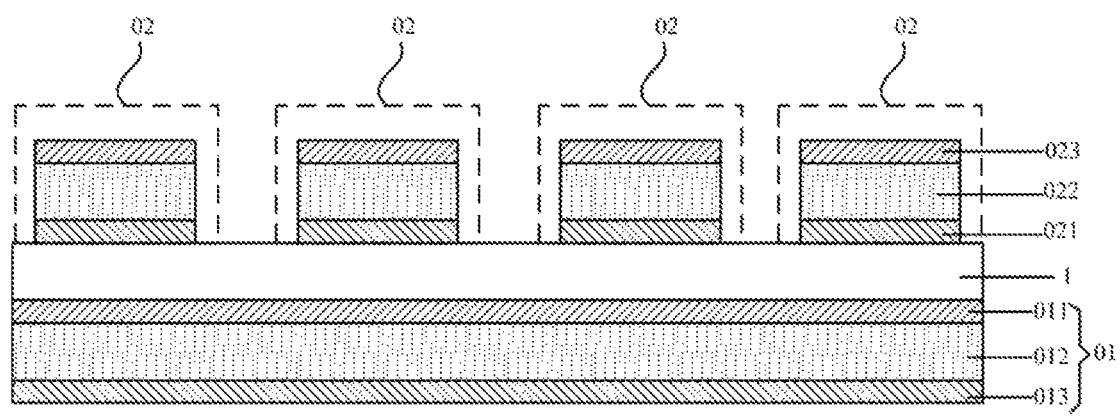
FIG. 5 is a schematic structural diagram of an ultrasonic wave transmitter in a touch control circuit according to an embodiment of the disclosure.

Optionally in the floating touch control panel according to the embodiments of the disclosure, as illustrated in FIG. 5, all the plurality of touch control circuits share one ultrasonic wave transmitter 01, that is, ultrasonic waves received by all the ultrasonic wave receivers 02 come from the ultrasonic wave transmitter 01.

The ultrasonic wave transmitter 01 includes a first planar electrode 011, a second piezoelectric material layer 012, and a second planar electrode 013, which overly the substrate 1 in that order; and one of the first planar electrode 011 and the second planar electrode 013 is configured to apply second fixed voltage, and the other of the first planar electrode 011 and the second planar electrode 013 is configured to apply alternating voltage. The second fixed voltage may or may not be the same fixed voltage as the first fixed voltage, although the embodiments of the disclosure will not be limited thereto.

Optionally in the floating touch control panel according to the embodiments of the disclosure, the ultrasonic wave transmitter 01 can be located on the side of the substrate 1 facing the touch control side, or can be located on the side of the substrate 1 facing away from the touch control side. When the ultrasonic wave transmitter 01 is arranged on the side of the substrate 1 facing away from the touch control side, the electrodes in the ultrasonic wave transmitter 01, and the other electrodes on the substrate 1 can be avoided from interfering with each other.

Optionally in the floating touch control panel according to the embodiments of the disclosure, the first piezoelectric material layer 022 and the second piezoelectric material layer 012 can be made of the same piezoelectric material, or can be made of different piezoelectric materials, although the embodiments of the disclosure will not be limited thereto.

Although the particular structure of the ultrasonic wave sensing unit 311 in the touch control sub-circuit 31 has been described above by way of an example, optionally the particular structure of the ultrasonic wave sensing unit 311 will not be limited to the structure above according to the embodiments of the disclosure, but can alternatively be another structure known to those skilled in the art, although the embodiments of the disclosure will not be limited thereto.

Optionally in the floating touch control panel according to the embodiments of the disclosure, as illustrated in FIG. 4, the light sensing unit 312 includes a photosensitive diode 04 located on the substrate 1, and facing the touch control side, where an anode of the photosensitive diode 04 is configured to apply third fixed voltage, and a cathode of the photosensitive diode 04 is connected with the first node A, so that when the modulated light emitted by the modulated light source 2 is reflected by the touching finger to the photosensitive diode 04, the photosensitive diode 04 converts the light into an electric signal, and stores the electric signal on the first node A. The third fixed voltage may or may not be the same fixed voltage as the first fixed voltage, although the embodiments of the disclosure will not be limited thereto.

Optionally in the floating touch control panel according to the embodiments of the disclosure, in order to simplify the circuits, the anode of the photosensitive diode 04 is connected with a second electrode 023 of an ultrasonic wave receiver 02 in a touch control circuit 3 including the photosensitive diode 04 as illustrated in FIG. 4.

Optionally in the floating touch control panel according to the embodiments of the disclosure, in order to better collect the modulated light reflected back by the finger, the light sensing unit 312 can further include a condensing lens 05 located on a side of the photosensitive diode 04 facing the touch control side as illustrated in FIG. 4.

Although the particular structure of the light sensing unit 312 in the touch control sub-circuit 31 has been described above by way of an example, optionally the particular structure of the light sensing unit 312 will not be limited to the structure above according to the embodiments of the disclosure, but can alternatively be another structure known to those skilled in the art, although the embodiments of the disclosure will not be limited thereto.

Optionally in the floating touch control panel according to the embodiments of the disclosure, as illustrated in FIG. 4, the reset sub-circuit 34 particularly includes a first switch transistor T1, where a gate of the first switch transistor T1 is connected with a corresponding second touch control scan line scan2, a first electrode of the first switch transistor T1 is configured to receive a reset signal, and a second electrode of the first switch transistor T1 is connected with the first node A.

Optionally in the floating touch control panel according to the embodiments of the disclosure, as illustrated in FIG. 4, the floating touch control panel can further include reset signal lines reset corresponding to the respective rows or columns of the plurality of touch control circuits 3, where the reset signal lines reset are configured to transmit reset signals to first switch transistors T1 in corresponding touch control circuits 3.

Although the particular structure of the reset sub-circuit 34 in the each touch control circuit 3 has been described above by way of an example, optionally the particular structure of the reset sub-circuit 34 will not be limited to the structure above according to the embodiments of the disclosure, but can alternatively be another structure known to those skilled in the art, although the embodiments of the disclosure will not be limited thereto.

Optionally in the floating touch control panel according to the embodiments of the disclosure, as illustrated in FIG. 4, the read sub-circuit 32 particularly includes a drive transistor T0.

A gate of the drive transistor T0 is connected with the first node A, a first electrode of the drive transistor T0 is configured to receive a reference signal, and a second electrode of the drive transistor T0 is configured to be connected with the output sub-circuit 33, so that when there is a higher potential accumulated on the first node A, the drive transistor outputs larger current to the output sub-circuit 33, where the potential of the first node A is determined by the ultrasonic wave sensing unit 311 or the light sensing unit 312 according to a touch control gesture.

Optionally in the floating touch control panel according to the embodiments of the disclosure, as illustrated in FIG. 4, the floating touch control panel further includes reference signal lines Vdd corresponding to the respective rows or columns of the plurality of touch control circuits 3, where the reference signal lines Vdd are configured to transmit reference signals to drive transistors T0 in corresponding touch control circuits 3.

Although the particular structure of the read sub-circuit 32 in the each touch control circuit 3 has been described above by way of an example, optionally the particular structure of the read sub-circuit 32 will not be limited to the structure above according to the embodiments of the disclosure, but can alternatively be another structure known to those skilled in the art, although the embodiments of the disclosure will not be limited thereto.

Optionally in the floating touch control panel according to the embodiments of the disclosure, as illustrated in FIG. 4, the output sub-circuit 33 particularly includes a second switch transistor T2, where a gate of the second switch transistor T2 is connected with a corresponding first touch control scan line scan1, a first electrode of the second switch transistor T2 is connected with the read sub-circuit 32, and a second electrode of the second switch transistor T2 is connected with a corresponding touch control read line readline.

Although the particular structure of the output sub-circuit 33 in the each touch control circuit 3 has been described above by way of an example, optionally the particular structure of the output sub-circuit 33 will not be limited to the structure above according to the embodiments of the disclosure, but can alternatively be another structure known to those skilled in the art, although the embodiments of the disclosure will not be limited thereto.

Figure 6:
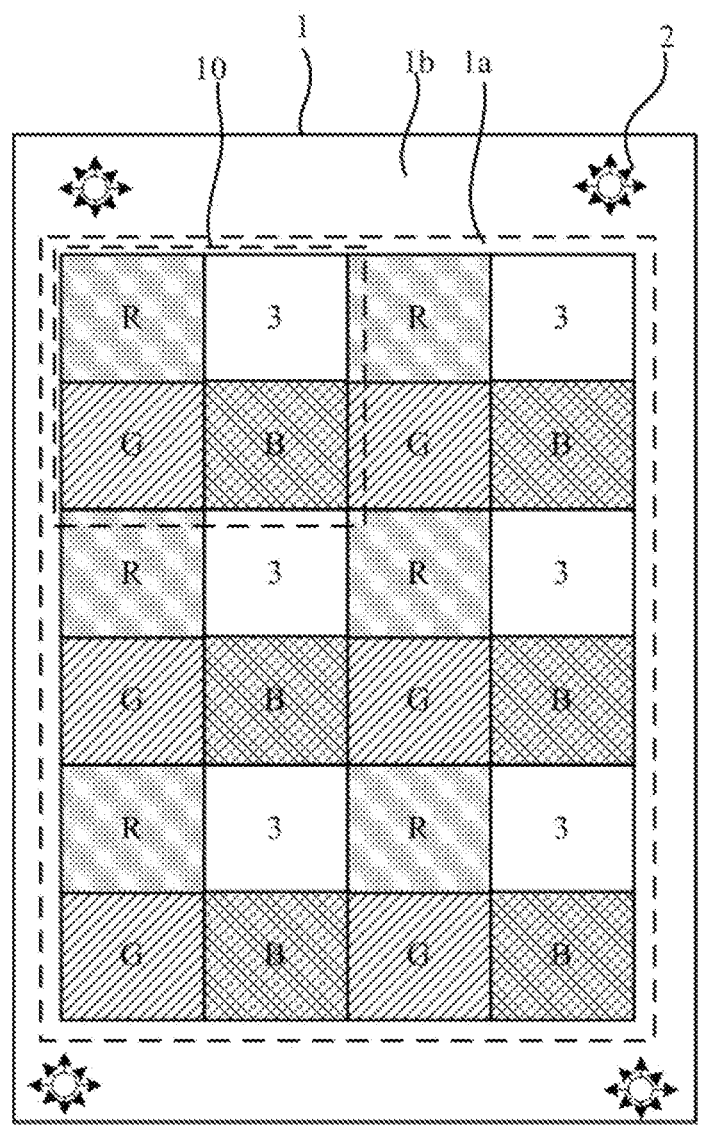
FIG. 6 is a second schematic structural diagram of a floating touch control panel according to an embodiment of the disclosure.

Optionally in the floating touch control panel according to the embodiments of the disclosure, as illustrated in FIG. 6, there are further pixel elements 10 arranged in a matrix on the substrate 1; and at least a part of the pixel elements 10 each includes at least four sub-pixel areas, where one touch control circuit 3 is arranged in one of the at least four sub-pixel areas, and sub-pixel structures for displaying are arranged in the remaining sub-pixel areas of the at least four sub-pixel areas. For example, a red sub-pixel structure R, a blue sub-pixel structure B, and a green sub-pixel structures G are arranged respectively in the remaining three sub-pixel areas as illustrated in FIG. 6.

Of course, optionally a white sub-pixel structure or a yellow sub-pixel structure can alternatively be arranged in the sub-pixel areas of each pixel element 10, although the embodiments of the disclosure will not be limited thereto.

Optionally in the floating touch control panel according to the embodiments of the disclosure, each pixel element includes at least four sub-pixel areas as illustrated in FIG. 6, where one touch control circuit is arranged in one of the at least four sub-pixel areas, and sub-pixel structures for displaying are arranged in the remaining sub-pixel areas of the at least four sub-pixel areas, so that the precision of the touch control can be improved.

Optionally in the floating touch control panel according to the embodiments of the disclosure, as illustrated in FIG. 6, the substrate 1 is defined as a display area 1a, and a border area 1b surrounding the display area, where the pixel elements 10 arranged in the matrix are located in the display area 1a, and the modulated light source 2 is located in the border area 1b.

Optionally in the floating touch control panel according to the embodiments of the disclosure, the floating touch control panel can include a plurality of modulated light sources 2 distributed evenly in the border area 1b as illustrated in FIG. 6, where FIG. 6 illustrates four modulated light sources 2 by way of an example, which are distributed evenly at four corners of the border area 1b respectively.

Optionally in the floating touch control panel according to the embodiments of the disclosure, the modulated light source 2 can be an LED modulated light source, although the embodiments of the disclosure will not be limited thereto.

In the floating touch control panel according to the embodiments of the disclosure, when there is a floating touch control at a short distance, the light propagates at such a high velocity that the light sensing unit cannot respond rapidly, but the sound wave is transmitted at such a lower velocity than the light velocity that the ultrasonic wave sensing unit is not required to be highly responsive, so the touch control action can be recognized according to the signal fed back by the ultrasonic wave sensing unit. When there is a floating touch control at a long distance, the sound wave is transmitted at such a low velocity that when there is a rapidly changing gesture, the ultrasonic wave sensing unit receives the signal at such a delay that the information is delayed; and the light propagates at such a high velocity that the touch control action can be recognized according to the signal fed back by the light sensing unit. In this way, when the floating touch control is performed at either a short or long distance, the touch control action can be recognized rapidly and accurately with the combination of the ultrasonic wave sensing unit and the light sensing unit.

Based upon the same inventive concept, embodiments of the disclosure further provide a touch control method of the floating touch control panel above, where for scanning each frame for a touch control, the method includes the following operations.

Before each frame is scanned for a touch control, turning on the modulated light source, and controlling the ultrasonic wave sensing unit in each of the plurality of touch control circuits to emit the ultrasonic wave.

Scanning each frame for a touch control by scanning each touch control scan line row by row, and when a touch control distance greater than a preset distance is determined, turning off the ultrasonic wave, and when a touch control distance less than or equal to the preset distance is determined, turning off the modulated light source.

The touch control method of the floating touch control panel according to the embodiments of the disclosure will be described below in connection with the touch control circuit illustrated in FIG. 4.

Before each frame is scanned for a touch control, the modulated light source is turned on, and the ultrasonic wave sensing unit in the each touch control circuit is controlled to emit an ultrasonic wave. Each frame is scanned for a touch control by scanning each touch control scan line row by row, determining whether there is a touch control action occurring, and if so, then if a touch control distance greater than the preset distance is determined, then turning off the ultrasonic wave, and determining the touch control action according to the light sensing unit; and if a touch control distance less than or equal to the preset distance is determined, turning off the modulated light source, and determining the touch control action according to the ultrasonic wave sensing unit.

For example, when the second touch control scan line scan2 in FIG. 4 is scanned, the first transistor T1 is turned on, the first transistor T1 which is turned on provides the first node A with a reset signal on the reset signal line reset, and the potential of the first node A is reset. When the first touch control scan line scan1 in FIG. 4 is scanned, the second transistor T2 is turned on, and the second transistor T2 which is turned on provides the touch control read line readline with a touch control signal output by the drive transistor T0.

1. If a touch control distance less than or equal to the preset distance is determined at this time, then since the modulated light source 2 is turned off, there is no electric signal output from the photosensitive diode 04, and the ultrasonic wave receiver 02 converts the received ultrasonic wave reflected back from the finger into an electric signal, and provides the first node A with the electric signal through the rectifying diode 03, where the potential of the first node A is determined by the distance of the reflected ultrasonic wave.

2. If a touch control distance greater than the preset distance is determined at this time, then since the ultrasonic wave transmitter 01 is turned off, there is no electric signal output from the ultrasonic wave receiver 02, and the photosensitive diode 04 converts the received modulated light reflected back from the finger into an electric signal, and provides the first node A with the electric signal, where the potential of the first node A is determined by the distance of the reflected modulated light.

3. If it is determined at this time that there is no touch control occurring, then both the modulated light source 2 and the ultrasonic wave transmitter 01 will be turned on, but there is no electric signal output from the ultrasonic wave receiver 02 and the photosensitive diode 04, and the first node A will be floating, where the potential of the first node A is still the potential thereof when it is reset.

Since the touch control signal output from the drive transistor T0 is determined by the potential of the first node A, the touch control action can be determined by analyzing the signal on the touch control read line readline.

Based upon the same inventive concept, embodiments of the disclosure further provide a display device including any one touch control panel above according to the embodiments of the disclosure. Since the display device addresses the problem under a similar principle to the floating touch control panel above, reference can be made to the implementation of the floating touch control panel above for an implementation of the display device, so a repeated description thereof will be omitted here.

The display device according to the embodiments of the disclosure is particularly applicable to a naked-eye 3D display device in which a touch control operation which is a floating touch control is performed on a 3D image.

In the floating touch control panel, the touch control method of the same, and the display device according to the embodiments of the disclosure, the floating touch control panel includes a substrate, a modulated light source, a plurality of touch control circuits, a plurality of first touch control scan lines, and a plurality of touch control read lines, where each touch control circuit includes a touch control sub-circuit, a read sub-circuit, and an output sub-circuit, where the touch control sub-circuit includes an ultrasonic wave sensing unit and a light sensing unit, where the ultrasonic wave sensing unit is configured to transmit an ultrasonic wave to a touch control side, to convert an ultrasonic wave reflected back from the touch control side into an electric signal, and to provide a first node with the electric signal converted by the ultrasonic wave sensing unit; and the light sensing unit is configured to convert a modulated light reflected from the touch control side into an electric signal, and to provide the first node with the electric signal converted by the light sensing unit; the read sub-circuit is configured to output a touch control signal to the output sub-circuit according to a potential of the first node; and the output sub-circuit is configured to be controlled by a corresponding first touch control scan line to provide a corresponding touch control read line with the received touch control signal. In this way, when there is a floating touch control at a short distance, the sound wave is transmitted at such a lower velocity than the light velocity that the ultrasonic wave sensing unit is not required to be highly responsive, so the touch control action can be recognized according to the signal fed back by the ultrasonic wave sensing unit. When there is a floating touch control at a long distance, the sound wave is transmitted at such a low velocity that when there is a rapidly changing gesture, the ultrasonic wave sensing unit receives the signal at such a delay that the information is delayed; and the light propagates at such a high velocity that the touch control action can be recognized according to the signal fed back by the light sensing unit. Therefore when the floating touch control is performed at either a short or long distance, the touch control action can be recognized rapidly and accurately with the combination of the ultrasonic wave sensing unit and the light sensing unit.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A floating touch control panel, comprising: a substrate, and a modulated light source, a plurality of touch control circuits arranged in an array, a plurality of first touch control scan lines corresponding to respective rows of the plurality of touch control circuits, and a plurality of touch control read lines corresponding to respective columns of the plurality of touch control circuits, wherein the modulated light source is configured to transmit modulated light to a touch control side; and each of the plurality of touch control circuits comprises a touch control sub-circuit, a read sub-circuit, and an output sub-circuit, wherein:

the touch control sub-circuit comprises an ultrasonic wave sensing unit and a light sensing unit, wherein the ultrasonic wave sensing unit is configured to transmit an ultrasonic wave to the touch control side, to convert an ultrasonic wave reflected back from the touch control side into an electric signal, and to provide a first node with the electric signal converted by the ultrasonic wave sensing unit; and the light sensing unit is configured to convert a modulated light reflected from the touch control side into an electric signal, and to provide the first node with the electric signal converted by the light sensing unit;

the read sub-circuit is configured to output a touch control signal to the output sub-circuit according to a potential of the first node; and the output sub-circuit is configured to be controlled by a corresponding first touch control scan line to provide a corresponding touch control read line with a received touch control signal;

wherein the ultrasonic wave sensing unit comprises an ultrasonic wave transmitter, an ultrasonic wave receiver, a rectifying diode, and a shielding layer overlying the rectifying diode, which are located on the substrate, wherein:

an anode of the rectifying diode is connected with the ultrasonic wave receiver, and a cathode of the rectifying diode is connected with the first node.

2. The floating touch control panel according to claim 1, wherein the ultrasonic wave receiver comprises a first electrode, a first piezoelectric material layer, and a second electrode, which are sequentially stacked on the substrate, wherein:

one of the first electrode and the second electrode is connected with the anode of the rectifying diode, and the other of the first electrode and the second electrode is configured to apply first fixed voltage.

3. The floating touch control panel according to claim 2, wherein the light sensing unit comprises a photosensitive diode located on the substrate, and facing the touch control side; and an anode of the photosensitive diode is configured to apply third fixed voltage, and a cathode of the photosensitive diode is connected with the first node.

4. The floating touch control panel according to claim 3, wherein the ultrasonic wave receiver is located on a side of the substrate facing the touch control side, and the anode of the photosensitive diode is connected with a second electrode of an ultrasonic wave receiver in a touch control circuit comprising the photosensitive diode.

5. The floating touch control panel according to claim 3, wherein the light sensing unit further comprises a condensing lens located on a side of the photosensitive diode facing the touch control side.

6. The floating touch control panel according to claim 1, wherein all of the plurality of touch control circuits share one ultrasonic wave transmitter, wherein:

the ultrasonic wave transmitter comprises a first planar electrode, a second piezoelectric material layer, and a second planar electrode, which overly the substrate in that order;

and one of the first planar electrode and the second planar electrode is configured to apply second fixed voltage, and the other of the first planar electrode and the second planar electrode is configured to apply alternating voltage.

7. The floating touch control panel according to claim 1, wherein there are further arranged on the substrate second touch control scan lines corresponding to the respective rows or columns of the plurality of touch control circuits; and each of the plurality of touch control circuits further comprises a reset sub-circuit configured to be controlled by a corresponding second touch control scan line to reset the potential of the first node.

8. The floating touch control panel according to claim 7, wherein second touch control scan lines corresponding to the respective rows of the plurality of touch control circuits other than a first row of the plurality of touch control circuits are first touch control scan lines corresponding to preceding rows of the plurality of touch control circuits.

9. The floating touch control panel according to claim 7, wherein second touch control scan lines corresponding to the respective rows of the plurality of touch control circuits other than a last row of the plurality of touch control circuits are first touch control scan lines corresponding to succeeding rows of the plurality of touch control circuits.

10. The floating touch control panel according to claim 7, wherein the reset sub-circuit comprises a first switch transistor, wherein:

a gate of the first switch transistor is connected with a corresponding second touch control scan line, a first electrode of the first switch transistor is configured to receive a reset signal, and a second electrode of the first switch transistor is connected with the first node.

11. The floating touch control panel according to claim 1, wherein the read sub-circuit comprises a drive transistor, wherein:

a gate of the drive transistor is connected with the first node, a first electrode of the drive transistor is configured to receive a reference signal, and a second electrode of the drive transistor is configured to be connected with the output sub-circuit.

12. The floating touch control panel according to claim 1, wherein the output sub-circuit comprises a second switch transistor, wherein:

a gate of the second switch transistor is connected with a corresponding first touch control scan line, a first electrode of the second switch transistor is connected with the read sub-circuit, and a second electrode of the second switch transistor is connected with a corresponding touch control read line.

13. The floating touch control panel according to claim 1, wherein there are further pixel elements arranged in a matrix on the substrate; and at least a part of the pixel elements each comprises at least four sub-pixel areas, wherein one of the plurality of touch control circuits is arranged in one of the at least four sub-pixel areas, and sub-pixel structures for displaying are arranged in remaining sub-pixel areas of the at least four sub-pixel areas.

14. The floating touch control panel according to claim 13, wherein the substrate is defined as a display area, and a border area surrounding the display area, wherein:

the pixel elements arranged in the matrix are located in the display area, and the modulated light source is located in the border area.

15. A display device, comprising the floating touch control panel according to claim 1.

16. A touch control method of the floating touch control panel according to claim 1, wherein for scanning each frame for a touch control, the method comprises the operations of:

before each frame is scanned for a touch control, turning on the modulated light source, and controlling the ultrasonic wave sensing unit in each of the plurality of touch control circuits to emit the ultrasonic wave; and scanning each frame for a touch control by scanning each of the plurality of touch control scan lines row by row, and when a touch control distance greater than a preset distance is determined, turning off the ultrasonic wave, and when the touch control distance less than or equal to the preset distance is determined, turning off the modulated light source.

* * * * *